Patented July 1, 1930

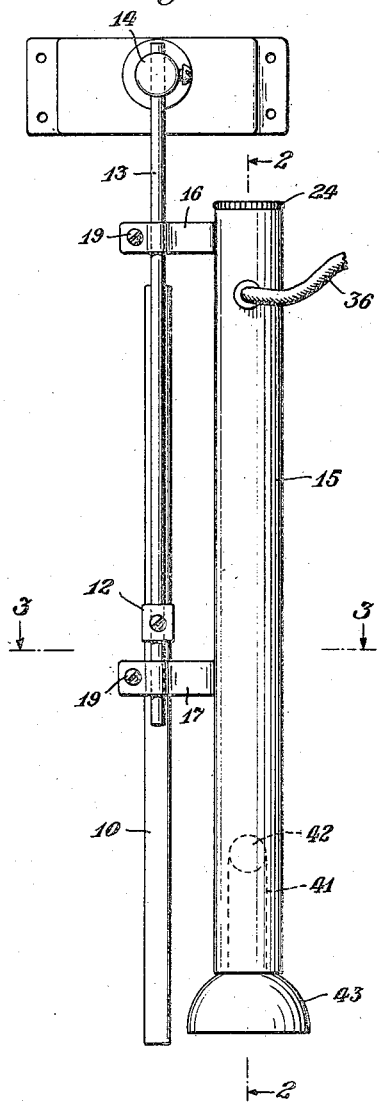
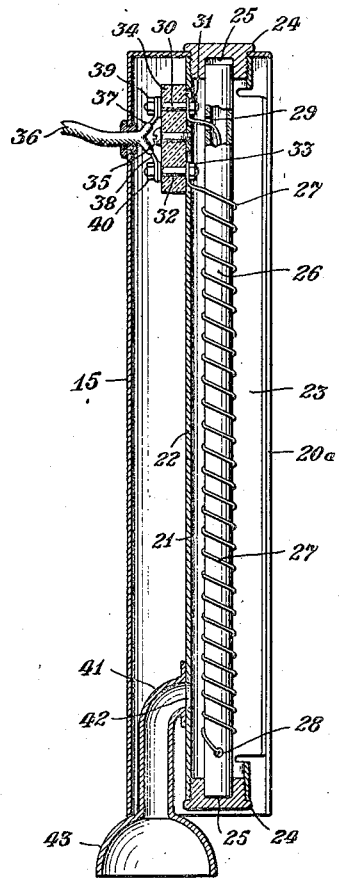
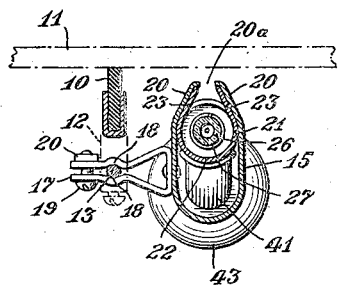

1,768,727

UNITED STATES PATENT OFFICE

JOSEPH H. YONAN, OF NEW BRITAIN, CONNECTICUT

ELECTRIC WINDSHIELD HEATER

Application filed April 20, 1929. Serial No. 356,835.

This invention relates to clear-vision producing devices for automobile windshields, and more particularly to an electrically heated device for attachment to a windshield wiper.

One object of this invention is to provide a device of the above nature adapted to deliver a continuous stream of hot air against the front of the windshield for preventing the formation of snow, sleet or ice thereon.

A further object of this invention is to provide a device of the above nature which will be simple in construction, inexpensive to manufacture, easy to install and adjust, compact, ornamental in appearance, and very efficient and durable in use.

With these and other objects in view there has been illustrated on the accompanying drawings one form in which the invention may be conveniently embodied in practice.

Fig. 1 represents a front view of the improved electric windshield heater as it appears when attached to the suspending rod of a windshield wiper.

Fig. 2 is a longitudinal sectional view taken along the line 2—2 of Fig. 1.

Fig. 3 is a transverse sectional view taken along the line 3—3 of Fig. 1.

Referring now to the drawings in which like reference numerals denote corresponding parts throughout the several views, the numeral 10 indicates the usual vibratory windshield wiper adapted to remove rain and moisture from the front of the windshield and thus maintain a clear vision area in front of the driver. The wiper 10 is connected by a clamp 12 to a wiper rod 13 adjustably suspended from an oscillating shaft 14 driven in any desired manner such as by a pneumatic or an electrical mechanism, not shown.

The electric windshield heater forming the subject of the present invention, comprises an outer U-shaped casing 15 adjustably connected to the wiper rod 13 by a pair of upper and lower U-shaped clips 16 and 17 riveted or otherwise secured to the side of the casing 15. The sides of each of the U-shaped clips 16 and 17 are provided with outwardly convex sections having interior grooves 18 for embracing the wiper rod 13, said grooves being held tightly against said wiper rod by means of a locking bolt 19 passing through the extremities of the side arm of said clip and held in locked position by a nut 20, as clearly shown in Fig. 3.

The rear of the outer casing 15 is provided with converging sections 20 forming an open mouth or slot 20$^a$ extending the full length of said casing and adapted to direct the flow of heated air against the front of the windshield.

In order to heat the air, provision is made of an inner casing 21 having a semi-cylindrical forward section 22 and a pair of converging sections 23 fitted snugly within the converging sections 20 of the outer casing 15. The upper and lower ends of the inner casing 21 are adapted to be closed and connected to the outer casing 15 by insulating screw plugs 24 having interior sockets 25 within which a hollow insulating core rod 26 is seated and centralized within the inner casing 21.

The heating element proper consists of a resistance wire 27 of nichrome or other suitable metal helically wound around the core rod 26. The lower end of the helical resistance wire is passed inwardly through an aperture 28 in the core rod 26 and thence upwardly and out through an aperture 29, the extremity thereof being connected to a binding post 30 by a nut 31.

The upper end of the helical resistance wire 27 is connected directly to a binding post 32 by a nut 33 and both of the binding posts 30 and 32 are permanently mounted in an insulating block 34 having a curved inner face for attachment to the front surface of the inner casing 21 as by a set screw 35. Current, as from a storage battery, not shown, is supplied to the heating element by means of a two-wire insulated conductor cord 36 having the conductor wires 37 and 38 thereof connected respectively to the binding posts 30 and 32 by nuts 39 and 40.

In order to cause a continuous stream of air to be automatically drawn into the inner casing 21 and circulated around the heating element 27 and thence passed out through the slot 20$^a$ against the windshield 11 provision is made of an elbow pipe 41. The pipe 41 is located between the outer and inner casings 15 and 21 near the bottom thereof, and communicates through an aperture 42 with the inner casing 21, as clearly shown in Fig. 2. The pipe 41 also extends out through the open bottom of the outer casing 13 where it has a depending flared bell-shaped air inlet 43.

Operation

In operation, air will be drawn up automatically through the bell-shaped air inlet 43, passing through the pipe 41 into the inner casing 21, where it will surround and be heated by the helical coil of resistance wire 27. The heated air will then pass out through the slot 20ª at the rear of the casing 15 and will impinge in a vertical column against the front surface of the windshield 11. As will be understood, since the windshield heater is oscillated by the wiper rod 13, the entire fan-shaped area in front of the driver will be kept free from snow, ice, and sleet. If it is desired to adjust the distance between the windshield heater and the windshield 11, it will merely be necessary to loosen the nuts 20 of the clips 16 and 17. The heater may then be moved to the desired position, after which the nuts will then be again tightened.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an electric windshield heater, a casing, an electric heating element enclosed within said casing and spaced from the walls thereof, means for admitting air to the bottom of said casing, means for attaching said casing to a windshield wiper, said casing having an outlet slot along one edge to permit a stream of heated air to impinge upon an adjacent windshield.

2. In an electric windshield heater, a casing, an electric heating element enclosed within said casing and spaced from the walls thereof, flared means for admitting air to the rear portion of the bottom of said casing, said casing having an outlet slot along one edge to permit a stream of heated air to impinge upon an adjacent windshield, and means for attaching said casing to a windshield wiper arm.

3. In a windshield heater, a casing adapted to be supported vertically adjacent the outer surface of a windshield, an electric heating element located within said casing, an air inlet and an air outlet for permitting the flow of air through said casing for transferring heat from said element to said windshield, and a pair of adjustable lateral clip members for releasably connecting said casing to a windshield wiper rod.

In testimony whereof I have affixed my signature to this specification.

JOSEPH H. YONAN.